United States Patent [19]
Morris

[11] Patent Number: 5,303,672
[45] Date of Patent: Apr. 19, 1994

[54] FOOD DISPENSING APPARATUS FOR SMALL ANIMALS

[76] Inventor: Stephen Morris, 1541 Garnet Avenue, Mississauga, Ontario, Canada, L5G 1C7

[21] Appl. No.: 19,806

[22] Filed: Feb. 19, 1993

Related U.S. Application Data

[63] Continuation-in-part of Ser. No. 833,036, Feb. 10, 1992, abandoned.

[51] Int. Cl.$^5$ .................. A01K 5/02; A01K 61/02
[52] U.S. Cl. .................. 119/51.11; 119/53; 222/650; 222/643
[58] Field of Search .......... 119/51.04, 51.11, 51.12, 119/51.13, 56.1, 53; 222/643, 650

[56] References Cited

U.S. PATENT DOCUMENTS

| | | | |
|---|---|---|---|
| 735,167 | 8/1903 | Steinberg | 119/51.11 |
| 3,033,164 | 5/1962 | Evers | 119/56.1 |
| 3,528,588 | 9/1970 | Moore | 119/51.04 |
| 4,878,455 | 11/1989 | van der Veer | 119/57.5 |
| 4,889,077 | 12/1989 | Passis | 119/51.11 |
| 4,964,535 | 10/1990 | Curwen | 222/67 |
| 4,993,364 | 2/1991 | Hessenauer | 119/51.11 |

FOREIGN PATENT DOCUMENTS 688159  9/1979  U.S.S.R. ................ 119/51.04

*Primary Examiner*—John G. Weiss
*Attorney, Agent, or Firm*—Weldon F. Green

[57] ABSTRACT

An improved dispensing apparatus for metering out feed to animals such as pets, or small livestock, such device delivering feed at pre-determined times and in a pattern which is consistent day-to-day so that the pre-selected feeding schedule is maintained. The device comprising a timer having a slowly rotating axial component, a dispenser in the form of a distribution wheel anchored to such axial component and disposed outwardly from the timer for axial rotation upon rotation of the axial component, and such distribution wheel including a series of axially spaced compartments for receiving feed from an associated hopper. The timer preferably rotates the axial component so that one standard rotation is completed in a 24-hour period. Accordingly, within such time period one complete rotation of the distribution wheel occurs. By appropriately blocking off certain of the compartments in the distribution wheel feed is delivered only to those available compartments and a pre-selected feeding schedule can be devised which is consistent day-to-day due to the 24-hour cyclical rotation of the distribution wheel.

9 Claims, 3 Drawing Sheets

FOOD DISPENSING APPARATUS FOR SMALL ANIMALS

This is a continuation-in-part of co-pending application Ser. No. 07/833,036, filed on Feb. 10, 1992 now abandoned.

FIELD OF THE INVENTION

This invention relates to a method and a device for the accurate metering of feed to animals such as pets, or small livestock, so that the right quantity of food is delivered at predetermined times and in a pattern which is consistent day-to-day so that a pre-selected feeding schedule is maintained.

BACKGROUND OF THE INVENTION

Automatic food dispensing systems for animals are well known in the art. Most, however, are directed towards expensive and relatively complex apparatus for distributing feed to livestock, such as the apparatus disclosed in U.S. Pat. No. 4,964,535, wherein a large hopper distributes the feed to a rapidly rotating distribution wheel which, in turn, dispenses feed to a trough from which livestock feed.

Other systems, such as the pet food dispenser disclosed in U.S. Pat. No. 4,993,364, basically utilizes similar elements as detailed in the feeding apparatus of U.S. Pat. No. 4,964,535, but on a smaller scale and specifically adapted for feeding pets. Again, such systems use rapidly rotating distribution wheels for discharging feed through, for example, an elongated opening at the bottom of the housing of the dispenser.

On account of the high rotation of the distribution wheel in these prior art devices, many moving parts and gears are required, making these devices expensive to manufacture and maintain. Further, rapidly rotating distribution wheels are subject to wear as the food particles pass between the distribution wheels and the hopper delivering feed to such wheels. In the event that food particles jam between the distribution wheel and the hopper a great strain is placed on the motor used to rotate the distribution wheel causing the motor to overload and possibly burn out, requiring expensive repairs.

Moreover, it can be appreciated that rapidly rotating distribution wheels are not suitable for continuous day-to-day operation. Continuous use of such systems would strain the motors driving the distribution wheel resulting in eventual burn out. As a consequence, these prior art devices can only deliver feed through manual activation, or, if continuous day-to-day operation is required, complex switching mechanisms needed to periodically activate the motors to rapidly rotate the distribution wheel and stop same at the pre-selected times.

As a consequence, most pet owners who use feeding systems of the prior art activate these systems subject to the time available to the pet owner—this does not provide and maintain well metered and rhythmic schedule of feeding for the animal.

OBJECTS OF THE INVENTION

It is, therefore, an object of this invention to provide a device for metering a desired quantity of food in pre-selected time intervals so that a regular feeding schedule is promoted and maintained over extended periods of time for the pet or small livestock in question.

It is, as a result, an object of this invention to provide an accurate timer and feed delivery system able to operate over many hours of continuous use providing consistent day-to-day delivery of feed with no deviation in the pre-selected feeding pattern metered.

Moreover, it is an object of this invention to provide an improved device for metering food which is simple in operation, yet relatively inexpensive and uncomplicated to manufacture and minimizing moving parts which can cause wear.

Finally, it is an object of this invention to provide an improved device for metering food which promotes the flow of food from a storage hopper to the animal to be fed and minimizing or eliminating jamming of food particles in the delivery system.

FEATURES OF THE INVENTION

It is a feature of this invention to provide a device for the accurate metering of feed to animals such as pets, or small livestock, so that the right quantity of food is delivered at predetermined times and in a pattern which is consistent day-to-day so that a pre-selected feeding schedule is maintained. The device for metering feed comprises a timer having a slowly rotating axial component to which is secured or fixed a dispenser, which in the preferred embodiment is in the form of a distribution wheel. A hopper, including a discharge orifice in the form of a chute, is arranged above the distribution wheel so as to deliver feed under gravity to compartments provided in the slowly rotating distribution wheel and transversely to its axis thereof.

It is a further feature of this invention to provide an improved device for metering feed wherein the rotating axial component of the timer completes one standard rotation in a 24-hour time period so that the distribution wheel secured thereto completes one rotation in such time period.

Moreover, it is a feature of this invention to provide a distribution wheel fixedly secured to the axial component of the timer which is circular in cross section and having its axis in alignment with that of the axial component of the timer.

Further, it is a feature of this invention to provide the distribution wheel with axially spaced partitions dividing such wheel into a plurality of axially spaced compartments adapted to receive feed under gravity from the hopper when disposed in underlying relation thereto, and dispense feed from such compartments under gravity upon appropriate axial rotation of the distribution wheel.

It is a feature of this invention to provide an improved device for metering feed wherein the compartments of the distribution wheel can be selectively blocked so as to present a plurality of open or closed compartments as desired and at pre-selected axially spaced intervals so that, upon slow rotation of such distribution wheel, feed is dispensed from available full compartments, or not dispensed from the closed compartments at the pre-selected time intervals so that a consistent day-to-day feeding schedule is maintained.

Moreover, it is a feature of this invention to provide a flexible interface between the compartments of the distribution wheel and the hopper to allow a smooth flow of feed from the storage hopper to the compartments of the distribution wheel. In particular, the chute or discharge orifice of the hopper presents a flexible edge to the edges of the partitions of the compartments of the distribution wheel which resiliently flex to allow passage of a food particle between such interface. Further, the partitions of the compartments of the distribution wheel can also present flexible edges to the flexible edges of the discharge orifice of the hopper to promote a flexible interface between the distribution wheel and the discharge orifice of the hopper allowing feed to flow smoothly from the hopper to the compartments of the distribution wheel. This effectively minimizes, if not eliminates, the possibility of feed becoming trapped or jammed between the discharge orifice of the hopper and the slowly rotating compartments of the distribution wheel.

DESCRIPTION OF THE INVENTION

Figure 2:
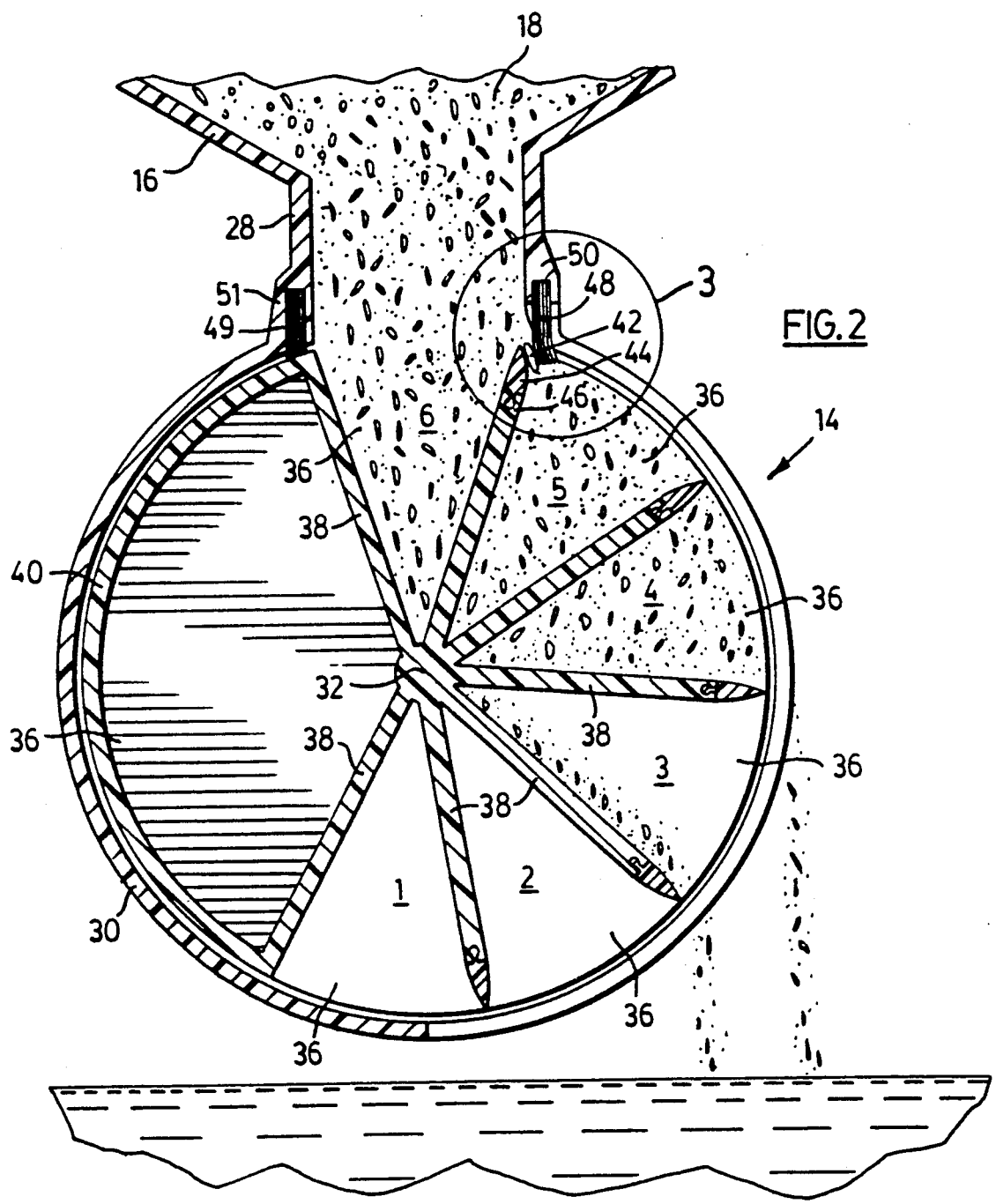
FIG. 2 is a cross-sectional view taken along the line 2—2 of FIG. 1, illustrating the dispensing device, and particularly the compartments of the distribution wheel of the invention.
Figure 4:
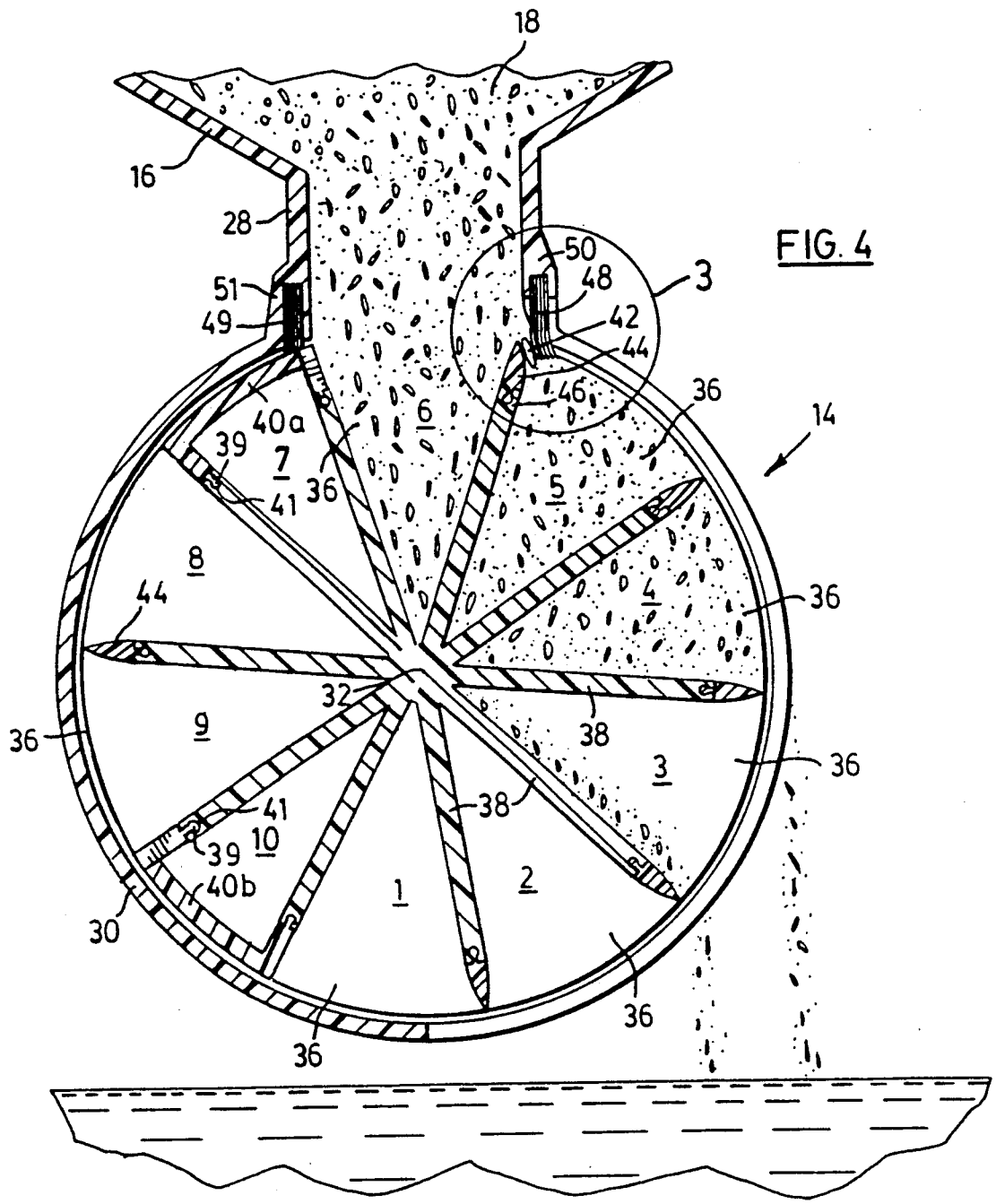

FIG. 3 is an enlarged portion as indicated at 3 in FIG. 2, illustrating the flexible interface between the respective edges of the chute or discharge orifice walls of the hopper and the partitions of the distribution wheel; and FIG. 4 is a view similar to FIG. 2 illustrating another preferred embodiment wherein removable panels or blocks are shown for the compartments of the distribution wheel so that a preselected feed pattern can be devised as desired.

Figure 1:
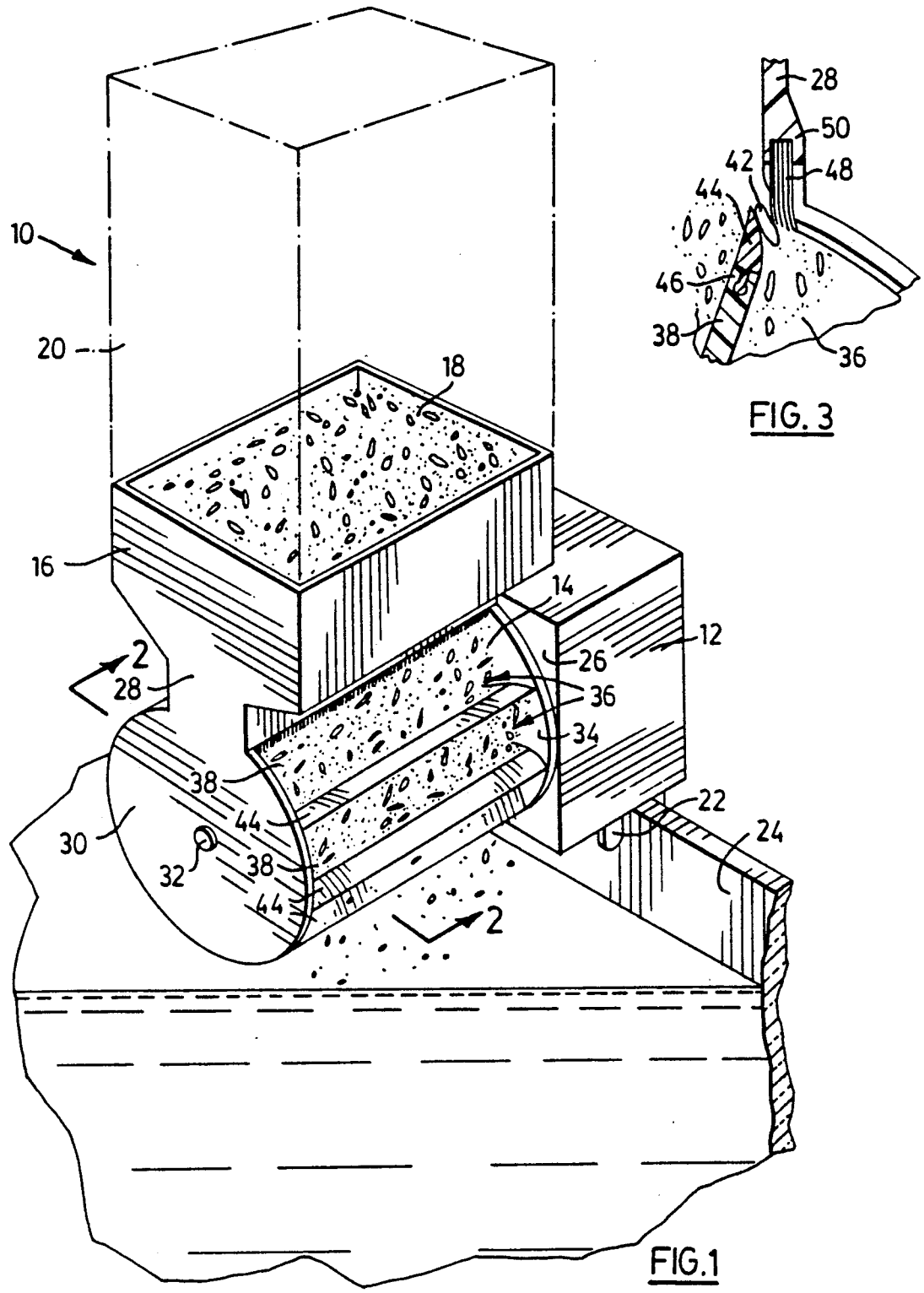
FIG. 1 is a perspective view of the dispensing device of this invention attached to a sample pet holding area, such as an aquarium, and illustrating the timer mechanism, a distribution wheel for delivering and metering out the required feed, and a hopper for storing feed.

The improved device of this invention for accurately metering a selected quantity of feed to be supplied to animals such as pets or small livestock, is illustrated in FIG. 1 at 10 and comprises a timer 12, a dispenser, which in the preferred embodiment is in the form of a distribution wheel 14, and a hopper 16 for delivering feed 18 to distribution wheel 14 and having a reservoir 20 for storing further feed to be dispensed.

Timer 12 of this invention is typically a 24-hour clock similar to those used to automatically turn on and shut off lights in homes at pre-selected time intervals and on a regular basis day-to-day to discourage theft when the occupants are not at home. Such single cycle 15 amp timers are well known in the art, but are applicable to this invention in that they have an axial component (to which the dial of a standard timer is fixed) which rotates slowly, and, particularly, completes one full rotation over a 24-hour. Although an electric timer is preferred, other timers can be used which are powered by other means, such as battery packs. All that is required is that the axial component of the timer has a slow period of rotation and that the timer has enough power to run over extended periods of time.

Timer 12 is secured through appropriate clips 22 or other means to the side of a holding tank for animals or pets such as a cage or, as illustrated in FIG. 1, aquarium 24. Further, timer 12 is orientated such that its front facing 26 which presents the slowly rotating axial component overlies aquarium 24, while the opposing face which typically presents an a.c. plug (not illustrated) is disposed away from aquarium 24; the plug is inserted in a standard wall outlet.

Appropriately secured to the casing of timer 12 and above distribution wheel 14 is hopper 16 which includes a discharge orifice such as dispensing chute 28 for delivering feed 18 under gravity to distribution wheel 14, and a depending support formation 30 for holding one end of distribution wheel 14, as will hereinafter be detailed. Hopper 16, and its associated chute 28 and support formation 30 can all be made of suitable plastic moulding, as well known in the art, and secured to the casing of timer 12 through suitable fasteners or epoxy glue. Alternatively, the casing of timer 12, hopper 16, and its associated chute 28 and support formation 30 can be constructed from one piece plastic moulding. Reservoir 20 which extends upwardly above hopper 16 can also be of plastic construction, and preferably of a clear acrylic plastic so that the amount of feed in the reservoir for delivery can be monitored at any given time.

Distribution wheel 14 is rotatably mounted upon the axial component of timer 12 and between front facing 26 of timer 12 and support formation 30 presented by hopper 16. In particular, if a standard off-the-shelf timer 12 is used, such as those used in controlling the switching on and off of lights in homes, then the dial of such timer is first removed exposing the slowly rotating axial component therein. Distribution wheel 14 is then appropriately fixed or anchored by its base 34 to the axial component of timer 12 through suitable fasteners such as screws or an epoxy glue, and particularly with axis 32 of distribution wheel 14 in alignment with the axis of the axial component of timer 12. In using timers specifically designed or modified for this invention, it can be appreciated that the axial component of the timers can be designed with appropriate interlocking snaps to which matching snaps can be provided on the distribution wheel for releasably locking same to the axial component of the timer.

Accordingly, distribution wheel 14 is fixedly anchored at one end to the axial component of timer 12, and, for additional support, has its axis 32 rotatably supported at its other end within an aperture provided in support formation 30 of hopper 16, as best illustrated in FIG. 1.

It can be appreciated that distribution wheel 14 by being fixedly anchored through base 34 to the slowly rotating axial component of timer 12 completes one rotation in a 24-hour period, upon activation of timer 12. This rotation of distribution wheel 14 by the axial component of timer 12 is regular and consistent day-to-day, so long as power continues to be supplied to timer 12.

In order that feed 18 can be appropriately metered in the desired amount to the pets or small livestock in the holding tank, distribution wheel 14 is divided into a number of pie shaped wedges or compartments 36 by appropriately axially spaced partitions 38 extending axially from axis 32 of distribution wheel 14 and between base 34 and support formation 30 of hopper 16, all as best illustrated in FIG. 1, and particularly in FIG. 2.

Partitions 38 are appropriately axially spaced so that compartments 36 are large enough to hold the feed to be dispensed. Since one compartment 36 might not hold enough feed for a given feeding period, the invention provides that a number of compartments can be axially located, side by side, for dispensing the required amount of feed.

In particular, the embodiment illustrated in FIG. 2 discloses six feeding compartments appropriately labelled as numbers 1, 2, 3, 4, 5, and 6. In the embodiment illustrated distribution wheel 14 has rotated such that compartment numbers 1 and 2 have already completely exhausted their supply of feed under gravity to aquarium 24; compartment number 3 has nearly exhausted its supply of feed under gravity; compartment number 4 is about to commence the dispensing under gravity of its feed; compartment number 5 has just been filled under gravity with feed 18 from hopper 16; and compartment number 6 is being filled under gravity with feed 18 by hopper 16 through chute 28.

Should it be desired that no feed be delivered over selected time intervals of the 24-hour cycle, then a compartment, or a number of compartments can be blocked off as at 40 for the compartment illustrated in FIG. 2. Consequently, during the time interval that this compartment is under chute 28 of hopper 16 no feed 18 will be loaded under gravity to distribution wheel 14 until compartment 1 again finds itself under chute 28 of hopper 16.

The pattern of compartments for distribution wheel 14 as selected in FIG. 2 would provide, upon appropriate setting and activation of timer 12, a steady slow metering of food for, say, a 14-hour period, commencing at, say, 8 o'clock in the morning, and ending at 10 o'clock at night, followed by 10 hours of no feeding. Due to the slow nature of the rotation of the axial component of timer 12, distribution wheel 14 rotates so that feed is dispensed under gravity from compartments 1 through 6 in a slow, natural manner spreading the feed out over the daylight hours and avoiding dropping clumps of food at any one given time interval to aquarium 24, which usually occurs when using a manual system or a dispensing system which utilizes rapidly rotating parts and which are energized only when feeding is desired. Further, this eliminates clumps of food being left in the tank before the animal can eat such a quantity, which, for fish food, spoils and dirties the water in aquarium 24.

In other alternatives of the invention for other animals such as rodents, for example, compartments 36 can be designed to provide food at pre-selected time intervals for regular feeding, such as, for example, 8 a.m., 12 noon, and 7 p.m. In such an alternative all the compartments of distribution wheel 14 would be similar to compartments 1 through 6, inclusive, with certain ones blocked off while others are selected to be open so that in the 24-hour cycle provided by timer 12, food is dispensed under gravity from distribution wheel 14 only at the pre-selected time intervals.

It can be appreciated that in alternative such embodiments of the invention, such as illustrated in FIG. 4, distribution wheel 14 can be provided with compartments 36 of equal dimensions and equally spaced throughout axis 32. Partitions 38 which divide distribution wheel 14 into a given number of compartments can be provided with suitable snaps or detents or indents 39 within which respective edges or projections 41 of suitable panels or blocks 40a and 40b can be inserted. In this manner, each individual compartment can be blocked off similar to the way that 40 provides a block in FIG. 2, but permitting the customizing of the distribution wheel 14 so that food can be dispensed at the desired time intervals suitable for specific animals, or, alternatively, enables the dispensing device to be readily modified so that different animals having a variety of feeding habits can be accommodated. In the embodiment illustrated in FIG. 4 panel 40a blocks compartment 7, while panel 40b blocks compartment 10, allowing two intervals over which fed is not supplied to the animal during the 24 hour revolution of distribution wheel 14.

Certain food types, when subject to moisture or other conditions, can clump together which, in turn, can jam at the interfaces between partitions 38 and chute 28 of hopper 16, such as particle cluster 42 as illustrated in FIG. 3. In order to minimize such clusters or large particles from jamming at the interface between partitions 38 and chute 28 resilient flexible tips 44 are provided along each respective ends 46 of partitions 38, and resilient flexible tips 48, 49 are provided at respective ends 50, 51 of chute 28 of hopper 16. Such flexible tips can be in the form of soft rubber, or, in the form of brushes, so long as they are flexible enough to deform upon contact with one another as illustrated in FIG. 3 yet resilient enough to return to their pre-deformed orientation. Should a food cluster or large particle, such as 42, enter the interface between flexible tips 44 and 48 of partitions 38 and chute 28, respectively, then the flexible nature of such tips would allow them to deform over such particle so that jamming is eliminated and the particle can fall under gravity to a compartment on either side of the partition.

In the preferred embodiment of the invention it is found that providing the partitions with soft rubber flexible tips, as illustrated, is desirable in that such tips minimize feed 18 from crossing from one compartment to another near the edges of the partitions. By providing flexible tips 48 and 49 of chute 28, in the form of brushes, however, it is found that such tips are advantageous in sweeping the outer surface of block 40 of the closed compartments keeping such surfaces clean or clear of feed.

Further, when utilizing the distribution wheel as illustrated in FIG. 2, it has been found advantageous to provide the partitions of the closed compartment with rounded corners (not illustrated) so that when such corners come in contact with flexible tips 48 and 49 of chute 28 a smooth interface will be presented between such tips and the corners of the partition when same are in contact. Again, this would minimize the chance of a food cluster or large particle from becoming jammed between such partition and the discharge orifice or chute 28 of hopper 16.

Moreover, when utilizing the embodiment illustrated in FIG. 4 the same indents 39 used in securing the edges or projections of the removable panels or blocks to the ends 46 of partitions 38 can be used in securing resilient flexible tips 44. This allows easy customising of the panels or blocks and flexible tips about the distribution wheel to preselect the arrangement of open and closed compartments as desired.

In order to reduce moisture from a holding tank or cage or aquarium from coming in contact with feed in the dispensing device, which would promote clumping of feed, a moisture impermeable barrier (not illustrated) can be placed around distribution wheel 14, and hopper 16. This barrier would present a narrow opening below the distribution wheel allowing feed to fall through under gravity to the holding tank or cage or aquarium.

The simplicity of the invention can be appreciated in that the timer is a standard off-the-shelf component, and all other parts are readily mouldable—yet the device is surprisingly durable. In particular, the axial component of a 24-hour standard timer possesses great torque due to its slow rotation and normal ability used in turning on or off a switch continuously at pre-selected time intervals over a considerable time period, for example when used in switching on and off lights in homes over many weeks. This slow 24-hour cyclical rotation of the axial component of timer 24 imparted to distribution wheel 14 allows a steady regular feed pattern to be provided to the animal in the holding tank, cage or aquarium over a considerable time period. Moreover, the high torque provided by the axial component of timer 12 to distribution wheel 14 makes the device very durable and able to withstand any interference in the feed delivery should rotation be stopped, for example, by a child holding or forcibly jamming rotation of distribution wheel 14. The timer, once the distribution wheel is cleared of obstructions, can be reset and operation continued—no burn out of the mechanism occurs, even when the device is "stopped" for many hours of operation.

While specific embodiments of this invention have been illustrated and described herein, the invention is not limited to the specific construction disclosed. Those skilled in the art may be able to provide modifications or alternatives to the disclosed structural features while still practising this invention. It is intended to cover all such modifications and alternatives as well as other embodiments not disclosed which do not constitute a departure from the spirit and scope of the attached claims.

What I claim is:

1. A dispensing device for metering out feed in a cyclical manner and at preselected time intervals over a given time period, comprising a timer including a slowly rotating axial component which completes one standard rotation in such time period, a dispenser anchored to said axial component and disposed outwardly from said timer for axial rotation upon rotation of said axial component and including a plurality of open compartments and at least one closed compartment presented transversely to said axial component and in a preselected arrangement for discharging feed under gravity from said open compartments upon appropriate rotation of said dispenser so as to meter out feed in a cyclical manner and at preselected time intervals during said time period, and a hopper including a discharge orifice for delivering feed to said open compartments of said dispenser.

2. A dispensing device according to claim 1 wherein said dispenser includes means removably secured to said compartments so as to form said plurality of open and closed compartments in a preselected arrangement.

3. A dispensing device according to claims 1 or 2 wherein said slowly rotating axial component of said timer completes one standard rotation in a 24-hour period.

4. A dispensing device according to claim 3 wherein said dispenser is circular in cross-section and has its central axis in axial alignment with said axial component of said timer.

5. A dispensing device according to claim 4 wherein said dispenser includes a series of axially spaced partitions dividing said dispenser into a plurality of preselected open and closed, spaced-apart, compartments.

6. A dispensing device according to claim 5 wherein said discharge orifice of said hopper presents a flexible edge to respective edges of said partitions of said dispenser providing a flexible interface between said discharge orifice of said hopper and said partitions of said compartments of said dispenser.

7. A dispensing device according to claim 6 wherein said partitions of said dispenser present flexible edges to said discharge orifice of said hopper providing a flexible interface between said discharge hopper and said compartments of said dispenser.

8. A dispensing device according to claim 5 wherein said partitions of said dispenser present flexible edges to said discharge orifice of said hopper providing a flexible interface between said discharge hopper and said compartments of said dispenser.

9. A method of metering out feed in a cyclical manner and at preselected time intervals over a given time period utilizing a dispensing device comprising a timer including a slowly rotating axial component which completes one standard rotation in such time period, a dispenser anchored to said axial component and including a plurality of open compartments and at least one closed compartment presented transversely to said axial component and having means removably secured to said compartments so as to preselect the arrangement of open and closed compartments for receiving and depositing feed under gravity at preselected time intervals and in a cyclical manner during said time period, and a hopper including a discharge orifice for providing feed under gravity to said plurality of open compartments of said dispenser, comprising the steps of:
   (a) suitably securing the feeding device upwardly and above the area to which feed is to be dispensed under gravity;
   (b) selecting the plurality of open compartments to dispense feed by using said means removable therefrom to arrange the desired sequence of said plurality of open compartments and at least one closed compartment;
   (c) filling the hopper with the feed required; and
   (d) actuating the timing mechanism so that the dispensing mechanism is cyclically rotated to dispense feed under gravity from said open compartments at the preselected time intervals and in a cyclical manner during said time period.

* * * * *